Dec. 20, 1960 L. FINKEL 2,965,771
BACK-TO-BACK ZENER DIODE BRIDGE GATING CIRCUIT
Filed Sept. 19, 1957
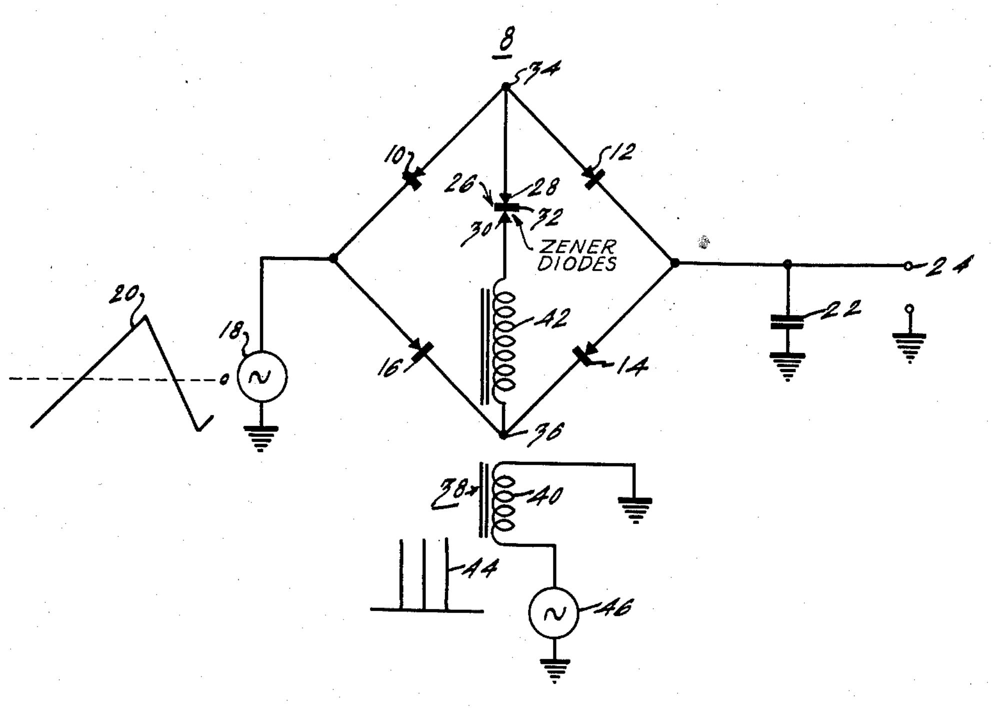
INVENTOR.
LEONARD FINKEL
BY
Edward M. Farrell
ATTORNEY United States Patent Office 2,965,771
Patented Dec. 20, 1960

2,965,771

BACK-TO-BACK ZENER DIODE BRIDGE GATING CIRCUIT

Leonard Finkel, Haddonfield, N.J., assignor, by mesne assignments, to American Bosch Arma Corporation, Hempstead, N.Y., a corporation of New York Filed Sept. 19, 1957, Ser. No. 684,889

4 Claims. (Cl. 307—88.5)

This invention relates to a coupling circuit, and more particularly to a coupling circuit employing bridge networks.

Very often it is desirable to sample electrical signals and couple such sampled signals to an output or storage circuit. During the time interval between samples, it is often important that no feedback or leakage exist between the source of electrical signals and the output or storage circuit. In such cases, an ideal coupling circuit would provide an extremely low or zero impedance during the sampling time intervals and a very high or infinite impedance during the time intervals between samples.

Coupling circuits exhibiting a low impedance during a sampling or gating interval and a high impedance between such gating intervals have been used in the past. Although such coupling circuits have proven satisfactory in many cases, it has been found that in cases requiring a great degree of precision that the degree of high impedance between the input and output circuit between the gating intervals has not been sufficiently great to prevent undesired leakage or feedback between the output and input circuits. Undesired leakage or feedback is particularly troublesome when the sampling or gating periods occur relatively infrequently.

It is an object of this invention to provide an improved gating circuit.

It is a further object of this invention to provide an improved coupling circuit having relatively high impedance for long time intervals between gating signals.

In accordance with the present invention, a coupling circuit for coupling signals from an input circuit comprises a bridge network including four arms. A device having a unidirection current conduction characteristic is connected in each of the arms. A double anode "Zener" diode, or a pair of back-to-back "Zener" diodes, is connected across diagonal terminals of the bridge network. Means are provided for applying a signal from the input circuit to the output circuit through the bridge network when a double anode diode is conducting. A high level gating signal is applied across the double anode diode to cause conduction in the bridge network during the gating interval thereby providing a low impedance. A storage device may be provided in the output circuit to receive sampled electrical signals from the input circuit during the gating interval.

Other objects and advantages of the present invention will be apparent and suggest themselves to those skilled in the art to which the present invention is related, from a reading of the following specification and claims in conjunction with the accompanying drawing, in which the sole figure is a schematic diagram illustrating the present invention.

Referring to the sole figure of the drawing, a balanced switch or coupling circuit 8 comprises diodes 10, 12, 14 and 16. These diodes form the arms of a bridge type of network.

An input circuit comprises a source 18. The type of electrical signal from the source 18 may be of various forms, such as for example, a sawtooth wave 20. The sawtooth wave 20, or other type of signal to be sampled may be an alternating signal of both positive and negative polarities. An output circuit which may, for example, be a storage circuit includes a capacitor 22. The capacitor 22 is connected to receive samples of the input signal 20 when the coupling circuit 8 provides a relatively low impedance as when the diodes in the circuit are in a conducting state. The sampled voltage developed across the capacitor 22 may then be applied across an output terminal 24 and a point of reference potential, designated as ground.

A double anode diode 26 includes anodes 28 and 30 with a single cathode 32. The double anode diode is connected between a pair of diagonal terminals 34 and 36. A transformer 38 includes a primary winding 40 and a secondary winding 42. The secondary winding 42 is connected between the anode 30 and the terminal 36.

A source of gating signals is provided by a source 46 and connected across the primary winding 40 of the transformer 38. The gating signals from the source 46 may, for example, be in the form of short relatively high level pulses, such as illustrated by the wave form 44.

The double anode diode 26 is of the so-called "Zener" type, such diodes having the unique reverse breakdown characteristic which permits conduction in the back direction when voltages exceeding certain values are applied. In many applications the effects of forward conduction are relatively important when "Zener" diodes are employed.

In considering the operation of the circuit, first consider the case where no gating voltage is applied to the coupling circuit 8 from the source 46. In this case, the voltage from the source 18 is not sufficiently great to cause conduction in any of the diodes illustrated. With no conduction in any of the diodes, a high impedance exists between the capacitor 22 and the source 18. The capacitor 22 will remain in an uncharged condition.

When the gating signal 44 from the source 46 is applied to the transformer 38, the amplitude of the gating signal exceeds the breakdown potential of the double anode diode 26 therein. One of the purposes of the transformer 38 is to step up the gating voltage to the amplitude necessary to cause breakdown of the double diode 26. It is noted that when one half of the double diode 26 is conducting in its back direction, the other half will conduct in its forward direction, with the polarity of the gating signal determining the direction of conduction.

When the double anode diode 26 conducts, a voltage is developed across terminals 34 and 36. This voltage is sufficiently great to cause conduction in the diodes 10 and 16, as well as in the diodes 12 and 14. During the gating interval, therefore, all of the diodes in the coupling circuit 8 become conducting. A low impedance path is therefore provided between the input circuit or source 18 and the output circuit or capacitor 22. Any type of unidirectional devices having a relatively large reverse breakdown characteristic may be used in place of the diodes 10, 12, 14 and 16.

In the intervals between gating pulses, all of the diodes again become non-conducting. During the non-conducting period, a high impedance between the input and output circuit is provided. It may therefore be seen that when a gating signal from the source 46 and a signal from the source 18 is applied to the coupling circuit 8, that a sample of the signal 20 will be periodically stored across the capacitor 22.

The coupling circuit 8 may be embodied in numerous types of sampling or commutating circuits. For example, in telemetry applications, it may be desired to sample information signals in order to provide a great number of information channels within a limited bandwidth.

It is noted that the voltage to be sampled from the source 18 may be of either polarity. The gating signal from the source 46 may also be of either polarity, since the transformer leads may be reversed to obtain the desired polarity. This provides a great convenience and simplicity of design in many applications and eliminates the necessity of additional phase inversion devices.

It is noted that the double anode diode 26 may be considered as a non-linear device which is non-conductive in both directions until a voltage exceeding a certain amplitude is reached.

A double anode diode of the "Zener" type is desirable so that a potential difference between the junctions 22 and 24 will not result in leakage through the coupling network 8.

In the circuit shown, a gating signal 44 must be of such a polarity so that when the double anode diode 26 is conducting, a junction 34 is positive with respect to the junction 36. This condition will allow the diodes 10, 12, 14 and 16 to become conductive.

Although a double anode diode 26 is illustrated, a pair of back-to-back diodes may be used in its place. However, since double anode diode provides more uniform characteristics for forward and back conduction, as well as occupying less space, it is preferred over the pair of back-to-back diodes. Other devices which possess the characteristic of being non-conductive until an applied potential exceeds a critical value, such as a neon bulb or similar devices, may be used in place of the double anode "Zener" diode.

It is noted that in the circuit shown, the voltage from the source 18 should not be of sufficient amplitude to cause conduction in the double anode diode 26. Means other than the transformer to provide a high voltage across the terminals 34 and 36 may be employed. Also, the sampled output signal may be applied directly to the output terminals 24 or to output circuits other than the capacitor 22 illustrated.

What is claimed is:

1. A coupling circuit for coupling signals from an input circuit to an output circuit during a gating period comprising a bridge network including four arms, a unidirectional conducting device connected in each of said arms, an element conductive in two directions normally nonconducting connected across diagonal terminals of said bridge network, said element becoming conductive when a voltage exceeding a predetermined amplitude is applied thereacross and being non-conductive when said voltage is below said predetermined amplitude, means for applying a signal from said input circuit to said output circuit when said element is conducting, and means for applying a gating signal across said diagonal terminals and in series with said element to cause substantially simultaneous conduction within each said unidirectional device and said element.

2. A coupling circuit for coupling signals from an input circuit to an output circuit during a gating period comprising a bridge network including four arms, a unidirectional conducting device connected in each of said arms, a double anode diode normally non-conducting connected across diagonal terminals of said bridge network, said double anode diode becoming conductive when a voltage exceeding a predetermined amplitude is applied thereacross and being non-conductive when said voltage is below said predetermined amplitude, means for applying a signal from said input circuit to said output circuit through said bridge network when said double anode diode is conducting, and means for applying a gating signal across said diagonal terminals of said bridge network in series with said double anode diode to cause substantially simultaneous conduction within each said uni-directional conducting device and said double anode diode.

3. A gating circuit comprising a source of electrical signals to be sampled, a storage circuit for storing sampled electrical signals, a coupling circuit for coupling said electrical signals from said source to said storage circuit during a gating interval, a bridge network including four arms included in said coupling circuit, a unidirectional conducting device connected in each of said arms, a normally non-conductive element conductive in either direction connected across diagonal terminals of said bridge network, said element being conductive when a voltage exceeding a predetermined amplitude is applied thereacross and being non-conductive when said voltage is below said predetermined amplitude, means for applying said electrical signals from said source to said storage circuit when said element is conducting, and means for applying a gating signal across said diagonal terminals to cause substantially simultaneous conduction within each said uni-directional device and said element.

4. A gating circuit comprising a source of electrical signals to be sampled, a storage circuit for storing sampled electrical signals, a coupling circuit for coupling said electrical signals from said source to said storage circuit during a gating interval, a bridge network including four arms included in said coupling circuit, a unidirectional conducting diode device connected in each of said arms, a normally non-conductive double anode diode connected across diagonal terminals of said bridge network, said double anode diode becoming conductive when a voltage exceeding a predetermined amplitude is applied thereacross and being non-conductive when said voltage is below said predetermined amplitude, means for applying said electrical signals from said source to said storage circuit when said double anode diode is conducting, a transformer having primary and secondary windings, said secondary winding being serially connected with said double anode diode across said diagonal terminals, and means for applying a gating signal across said primary winding to cause substantially simultaneous conduction in said double anode diode and each said unidirectional conducting diode device.

References Cited in the file of this patent

UNITED STATES PATENTS

| | | |
|---|---|---|
| 2,086,601 | Caruthers | July 13, 1937 |
| 2,275,308 | Niemann | Mar. 3, 1942 |
| 2,658,142 | John | Nov. 3, 1953 |
| 2,789,254 | Bodle et al. | Apr. 16, 1957 |
| 2,799,829 | Gordon et al. | July 16, 1957 |
| 2,866,103 | Blake et al. | Dec. 23, 1958 |
| 2,870,346 | Essler | Jan. 20, 1959 |
| 2,899,569 | Kircher | Aug. 11, 1959 |